United States Patent
Paruchuri et al.

(10) Patent No.: US 12,509,992 B2
(45) Date of Patent: Dec. 30, 2025

(54) OUTLET GUIDE VANE FOR A GAS TURBINE ENGINE AND METHOD

(71) Applicant: ROLLS-ROYCE plc, London (GB)

(72) Inventors: Chaitanya Paruchuri, Southampton (GB); Suresh Palani, Southampton (GB); Philip Joseph, Southampton (GB); Sergi Palleja Cabre, Southampton (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 18/746,298

(22) Filed: Jun. 18, 2024

(65) Prior Publication Data
US 2025/0223908 A1    Jul. 10, 2025

(30) Foreign Application Priority Data
Jul. 5, 2023    (GB) .................................... 2310306

(51) Int. Cl.
*F01D 5/28* (2006.01)
*F01D 9/02* (2006.01)
*F01D 25/00* (2006.01)

(52) U.S. Cl.
CPC ................ *F01D 5/28* (2013.01); *F01D 9/02* (2013.01); *F01D 25/005* (2013.01); *F05D 2240/12* (2013.01); *F05D 2260/96* (2013.01)

(58) Field of Classification Search
CPC . F01D 5/28; F01D 9/02; F01D 25/005; F05D 2240/12; F05D 2260/96
See application file for complete search history.

(56) References Cited

U.S. PATENT DOCUMENTS

| | | | | |
|---|---|---|---|---|
| 6,287,080 B1 * | 9/2001 | Evans | ..................... | B29C 39/10 416/241 A |
| 6,364,616 B1 * | 4/2002 | Stevenson | ............... | F01D 5/147 416/241 A |

(Continued)

FOREIGN PATENT DOCUMENTS

| | | |
|---|---|---|
| DE | 102017205515 A1 | 10/2018 |
| GB | 1235545 A | 6/1971 |

(Continued)

OTHER PUBLICATIONS

Great Britain search report dated Nov. 30, 2023, issued in GB Patent Application No. 2310306.2.

(Continued)

*Primary Examiner* — Brian P Wolcott
(74) *Attorney, Agent, or Firm* — Barnes & Thornburg

(57) ABSTRACT

An outlet guide vane includes an aerofoil body including a root, a tip, a leading edge extending between the root and the tip, a trailing edge opposite to the leading edge, a pressure surface extending between the leading edge and trailing edge, and a suction surface extending between the leading edge and trailing edge opposite to the pressure surface. The outlet guide vane further includes a flexible membrane disposed along the pressure surface and/or the suction surface of the aerofoil body, such that the flexible membrane at least partially forms an outer surface of the outlet guide vane. The aerofoil body has a first modulus of elasticity and the flexible membrane has a second modulus of elasticity, wherein the first modulus of elasticity of the aerofoil body is greater than the second modulus of elasticity of the flexible membrane by a factor of at least 2.

20 Claims, 10 Drawing Sheets

(56) References Cited

U.S. PATENT DOCUMENTS

| | | | |
|---|---|---|---|
| 6,454,536 B1 * | 9/2002 | Evans | F01D 5/147 416/241 A |
| 7,334,997 B2 * | 2/2008 | Karafillis | F01D 5/34 416/224 |
| 7,575,417 B2 * | 8/2009 | Finn | F04D 29/324 428/292.1 |
| 7,794,210 B2 * | 9/2010 | Clark | F01D 5/16 416/223 R |
| 8,177,513 B2 * | 5/2012 | Shim | F04D 29/023 29/889.7 |
| 9,453,418 B2 * | 9/2016 | Hui | F01D 5/282 |
| 10,125,616 B2 * | 11/2018 | Rosenau | F04D 29/388 |
| 10,371,097 B2 * | 8/2019 | Sellinger | F01D 5/282 |
| 2003/0031556 A1 | 2/2003 | Mulcaire et al. | |
| 2003/0069321 A1 * | 4/2003 | Lin | C08J 9/32 521/137 |
| 2004/0151585 A1 | 8/2004 | Jones | |
| 2006/0275132 A1 | 12/2006 | McMillan | |
| 2017/0292531 A1 | 10/2017 | Snyder | |
| 2017/0298758 A1 | 10/2017 | Mears | |
| 2018/0009201 A1 * | 1/2018 | Sellinger | F01D 5/282 |
| 2018/0010614 A1 * | 1/2018 | Sellinger | F02K 3/06 |
| 2019/0017439 A1 | 1/2019 | Riou et al. | |
| 2019/0128123 A1 | 5/2019 | Paruchuri et al. | |
| 2021/0039767 A1 | 2/2021 | Paruchuri et al. | |

FOREIGN PATENT DOCUMENTS

| | | |
|---|---|---|
| GB | 2361035 A | 10/2001 |
| WO | 2018009419 A1 | 1/2018 |

OTHER PUBLICATIONS

Sergi Palleja-Cabre et al., "Downstream porosity for the reduction of turbulence-aerofoil interaction noise," Journal of Sound and Vibration 541 (2022) Sep. 28, 2022.

* cited by examiner

OUTLET GUIDE VANE FOR A GAS TURBINE ENGINE AND METHOD

CROSS-REFERENCE TO RELATED APPLICATIONS

This specification is based upon and claims the benefit of priority from United Kingdom patent application number GB 2310306.2 filed on Jul. 5, 2023, the entire contents of which is incorporated herein by reference.

BACKGROUND

Technical Field

The present disclosure relates to an outlet guide vane for a gas turbine engine and a method of reducing noise generated by an outlet guide vane during operation of a gas turbine engine.

Description of the Related Art

Noise from an aircraft is an ongoing environmental concern. There are typically several sources of noise from the aircraft, including jet noise produced by shear interaction between jet exhaust from gas turbine engines, and aerodynamic noise caused primarily by turbulent air created by flow of air over aircraft surfaces.

One particular source of noise is due to an interaction between a wake resulting from an upstream component, such as a fan or a propeller rotor, impinging on a leading edge of a downstream component, such as an outlet guide vane (OGV) of a gas turbine engine.

Therefore, it may be desirable to design the outlet guide vane in a manner that reduces noise generated thereby during operation of the gas turbine engine. A conventional outlet guide vane may include holes or porous areas for reducing noise generated thereby during operation of the gas turbine engine. However, such holes and porous areas may increase aerodynamic losses and negatively affect a strength of the outlet guide vane.

SUMMARY

According to a first aspect there is provided an outlet guide vane for a gas turbine engine. The outlet guide vane includes an aerofoil body. The aerofoil body includes a root and a tip that is remote from the root. The aerofoil body further includes a leading edge extending between the root and the tip, and a trailing edge extending between the root and the tip opposite to the leading edge. The aerofoil body further includes a pressure surface extending between the leading edge and the trailing edge, and a suction surface extending between the leading edge and the trailing edge opposite to the pressure surface. The outlet guide vane further includes a flexible membrane disposed along the pressure surface and/or the suction surface of the aerofoil body, such that the flexible membrane at least partially forms an outer surface of the outlet guide vane. The aerofoil body has a first modulus of elasticity and the flexible membrane has a second modulus of elasticity. The first modulus of elasticity of the aerofoil body is greater than the second modulus of elasticity of the flexible membrane by a factor of at least 2.

The outlet guide vane of the present disclosure may generate less noise as compared to a conventional outlet guide vane during operation of a gas turbine engine. Specifically, the flexible membrane may dampen an unsteady pressure generated at the leading edge of the aerofoil body, thereby reducing the noise generated during operation of the gas turbine engine. Moreover, the flexible membrane may not have a significant adverse effect on an aerodynamic performance of the aerofoil body. Therefore, the outlet guide vane may have improved aerodynamic performance than that of a conventional outlet guide vane having holes or porosity.

In some embodiments, the aerofoil body has a chord length that is defined between the leading edge and the trailing edge along a chordal direction. Further, the flexible membrane has a maximum length that is defined along the chordal direction. The maximum length of the flexible membrane is greater than or equal to 30% of the chord length.

The flexible membrane having the maximum length of greater than or equal to 30% of the chord length may provide beneficial noise reduction during operation of the gas turbine engine.

In some embodiments, the maximum length of the flexible membrane is equal to the chord length, such that at least a portion of the flexible membrane extends from the leading edge to the trailing edge of the aerofoil body.

The flexible membrane having the maximum length that is equal to the chord length may substantially cover the pressure surface and/or the suction surface and improve noise reduction during operation of the gas turbine engine.

In some embodiments, the flexible membrane is spaced apart from the leading edge by a first distance that is defined along the chordal direction. The first distance is from 5% to 20% of the chord length.

The flexible membrane being spaced apart from the leading edge by the first distance may reduce or minimise an effect of the flexible membrane on an aerodynamic performance of the aerofoil body.

In some embodiments, the aerofoil body further has a span that is defined between the root and the tip along a spanwise direction. Further, the flexible membrane has a maximum height that is defined along the spanwise direction. The maximum height of the flexible membrane is greater than or equal to 30% of the span.

The flexible membrane having the maximum height of greater than or equal to 30% of the span may provide beneficial noise reduction during operation of the gas turbine engine.

In some embodiments, the flexible membrane is spaced apart from the root by a second distance that is defined along the spanwise direction. The second distance is from 40% to 70% of the span.

A majority of the noise generated by the outlet guide vane during operation of the gas turbine engine may be due to the unsteady pressure generated at the leading edge above 60% of the span from the root.

Advantageously, spacing apart the flexible membrane from the root by the second distance may allow use of the flexible membrane having reduced dimensions (e.g., a smaller magnitude of the maximum height) to dampen the unsteady pressure generated at the leading edge above 60% of the span from the root.

In some embodiments, the flexible membrane is attached to the pressure surface and/or the suction surface of the aerofoil body.

In some embodiments, the flexible membrane is attached to the pressure surface and/or the suction surface of the aerofoil body by at least one of an adhesive and a fastener.

Therefore, the flexible membrane may be conveniently attached to the pressure surface and/or the suction surface of the aerofoil body.

In some embodiments, the flexible membrane includes an elastomeric material.

In some embodiments, the elastomeric material includes a latex. For example, the elastomeric material may include a latex rubber.

In some embodiments, the flexible membrane includes aramid fibres. For example, the flexible membrane may include KEVLAR™ fabric.

According to a second aspect there is provided a gas turbine engine. The gas turbine engine includes the outlet guide vane of the first aspect.

According to a third aspect there is provided a method of reducing noise generated by an outlet guide vane of a gas turbine engine during operation of the gas turbine engine. The outlet guide vane includes an aerofoil body. The aerofoil body includes a root and a tip that is remote from the root. The aerofoil body further includes a leading edge extending between the root and the tip, and a trailing edge extending between the root and the tip opposite to the leading edge. The aerofoil body further includes a pressure surface extending between the root and the tip opposite to the leading edge, and a suction surface extending between the leading edge and the trailing edge opposite to the pressure surface. The method includes providing a flexible membrane along the pressure surface and/or the suction surface of the aerofoil body of the outlet guide vane, such that the flexible membrane at least partially forms an outer surface of the outlet guide vane.

The method of the present disclosure may be performed to reduce noise generated by the outlet guide vane during operation of the gas turbine engine. Specifically, the flexible membrane may dampen an unsteady pressure generated at the leading edge of the aerofoil body, thereby reducing the noise generated during operation of the gas turbine engine. Moreover, the flexible membrane may not have a significant adverse effect on an aerodynamic performance of the aerofoil body.

In some embodiments, providing the flexible membrane along the pressure surface and/or the suction surface of the aerofoil body of the outlet guide vane includes attaching the flexible membrane to the pressure surface and/or the suction surface.

The flexible membrane may be conveniently attached to the pressure surface and/or the suction surface of the aerofoil body via at least one of an adhesive and a fastener.

As used herein, "at least one of A and B" should be understood to mean "only A, only B, or both A and B."

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e., the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
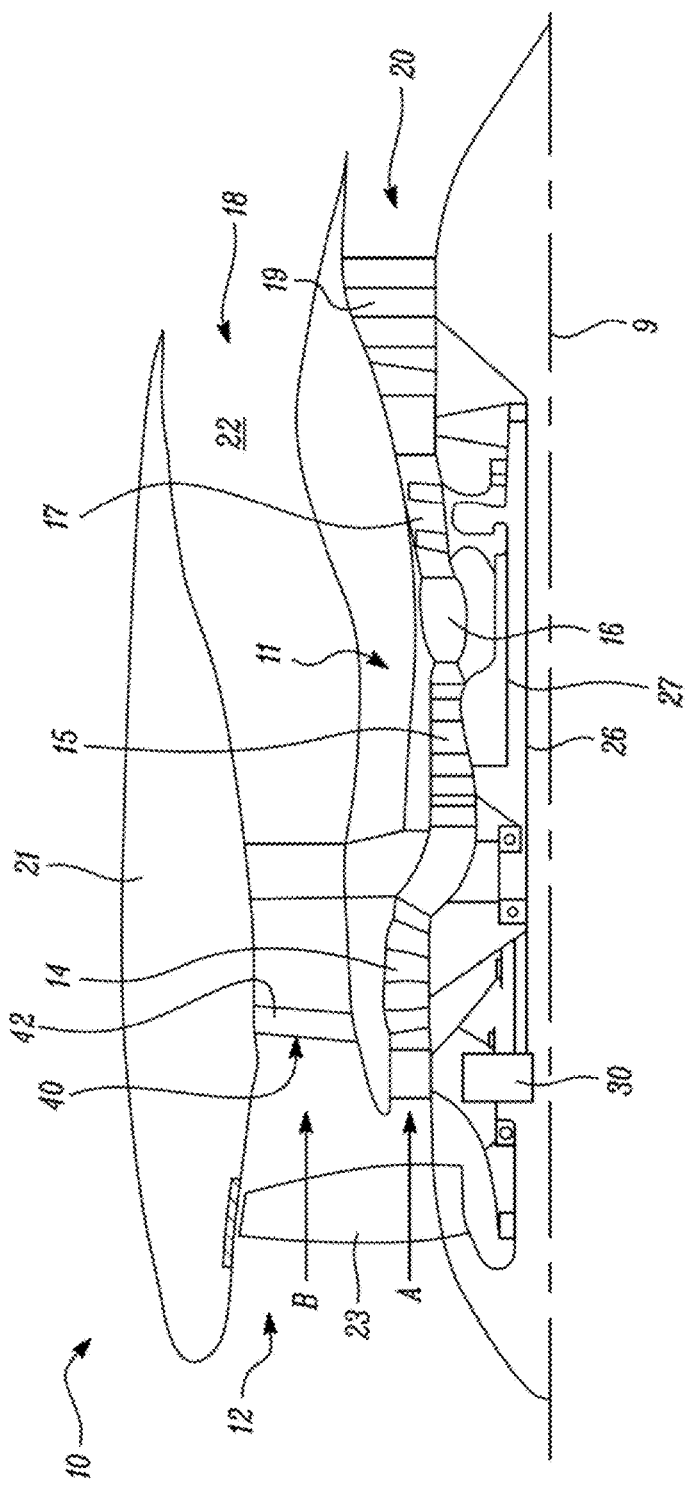
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage. The combustion equipment 16 may alternatively be referred to as "the combustor 16."

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial, and circumferential directions are mutually perpendicular.

The gas turbine engine 10 may further include an outlet guide vane assembly 40. The outlet guide vane assembly 40 may include a plurality of outlet guide vanes 42 circumferentially spaced apart from each other about the rotational axis 9. The plurality of outlet guide vanes 42 may be configured to turn and/or direct the bypass airflow B axially in the bypass duct 22.

FIGS. 2A and 2B show one outlet guide vane 42 from the plurality of outlet guide vanes 42 of FIG. 1. Specifically, FIG. 2A shows a schematic side view of the outlet guide vane 42, and FIG. 2B shows a schematic cross-sectional view of the outlet guide vane taken along a line 1-1 of FIG. 2A.

The outlet guide vane 42 includes an aerofoil body 50. The aerofoil body 50 includes a root 51 and a tip 52 that is remote from the root 51. The aerofoil body 50 further includes a leading edge 53 extending between the root 51 and the tip 52. The aerofoil body 50 further includes a trailing edge 54 extending between the root 51 and the tip 52 opposite to the leading edge 53. The aerofoil body 50 further includes a pressure surface 55 extending between the leading edge 53 and the trailing edge 54. The aerofoil body 50 further includes a suction surface 56 (shown in FIG. 2B) extending between the leading edge 53 and the trailing edge 54 opposite to the pressure surface 55. The outlet guide vane 42 further includes an outer surface 44. The pressure surface 55 and the suction surface 56 of the aerofoil body 50 may at least partially define the outer surface 44 of the outlet guide vane 42.

Figure 3:
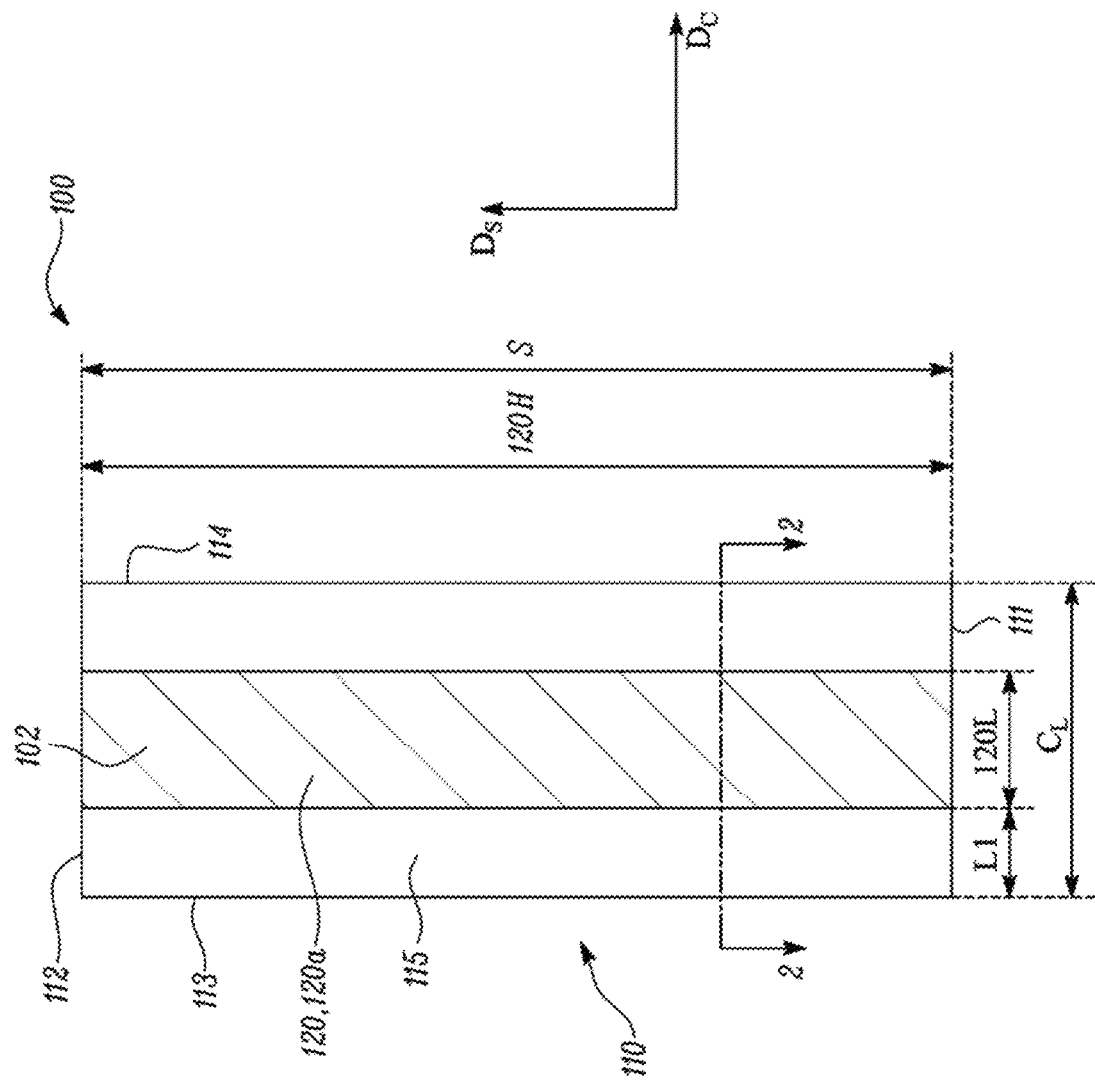
FIG. 3 is a schematic side view of an outlet guide vane.
Figure 4:
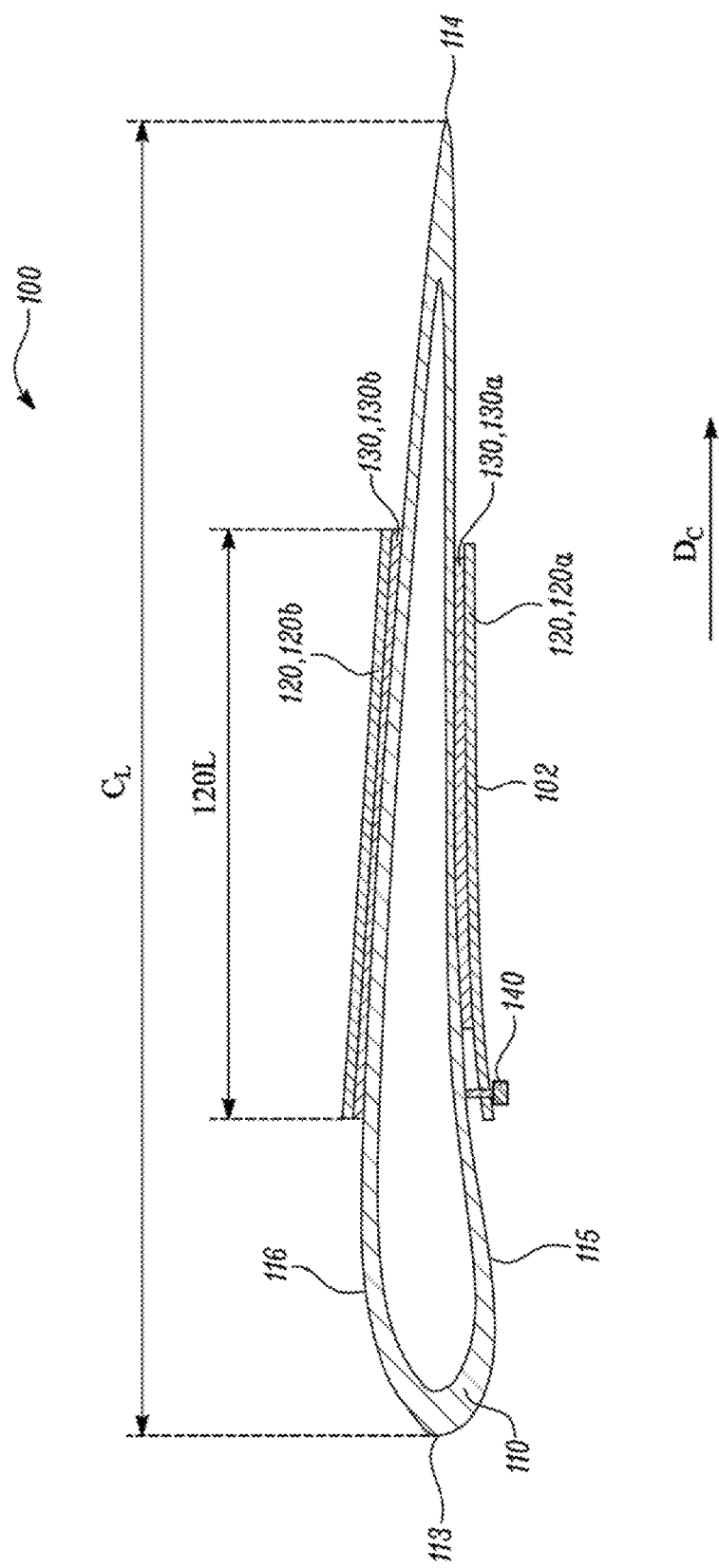
FIG. 4 is a schematic cross-sectional view of the outlet guide vane taken along a line 2-2 of FIG. 3.

FIGS. 3 and 4 show an outlet guide vane 100 for a gas turbine engine (e.g., the gas turbine engine 10 of FIG. 1) in accordance with an embodiment of the present disclosure. Specifically, FIG. 3 shows a schematic side view of the outlet guide vane 100, and FIG. 4 shows a schematic cross-sectional view of the outlet guide vane 100 taken along a line 2-2 of FIG. 3.

The outlet guide vane 100 includes an aerofoil body 110. The aerofoil body 110 includes a root 111 and a tip 112 that is remote from the root 111. The aerofoil body 110 further includes a leading edge 113 extending between the root 111 and the tip 112. The aerofoil body 110 further includes a trailing edge 114 extending between the root 111 and the tip 112 opposite to the leading edge 113. The aerofoil body 110 further includes a pressure surface 115 extending between the leading edge 113 and the trailing edge 114. The aerofoil body 110 further includes a suction surface 116 (shown in FIG. 4) extending between the leading edge 113 and the trailing edge 114 opposite to the pressure surface 115.

As used herein, the term "chordal direction $D_C$" refers to a direction generally extending from the leading edge 113 to the trailing edge 114 of the aerofoil body 110. Further, the term "spanwise direction $D_S$" refers to a direction generally extending from the root 111 to the tip 112 of the aerofoil body 110. The spanwise direction $D_S$ is generally perpendicular to the chordal direction $D_C$.

The aerofoil body 110 may have a chord length $C_L$ that is defined between the leading edge 113 and the trailing edge 114 along the chordal direction $D_C$. The aerofoil body 110 may further have a span S that is defined between the root 111 and the tip 112 along the spanwise direction $D_S$.

The outlet guide vane 100 further includes a flexible membrane 120 (shown with hatching for clarity of illustration) disposed along the pressure surface 115 and/or the suction surface 116 of the aerofoil body 110, such that the flexible membrane 120 at least partially forms an outer surface 102 of the outlet guide vane 100. Therefore, the flexible membrane 120 at least partially contacts an airflow across the outlet guide vane 100.

The outlet guide vane 100 may generate less noise as compared to a conventional outlet guide vane (e.g., the outlet guide vane 42 of FIG. 2) during operation of a gas turbine engine (e.g., the gas turbine engine 10 of FIG. 1). Specifically, the flexible membrane 120 may dampen an unsteady pressure that is generated at the leading edge 113 of the aerofoil body 110 during operation of the gas turbine engine. Moreover, the flexible membrane 120 may not have a significant adverse effect on an aerodynamic performance of the aerofoil body 110.

In some embodiments, the flexible membrane 120 may be disposed only along the pressure surface 115. In some embodiments, the flexible membrane 120 may be disposed only along the suction surface 116. In some embodiments, the flexible membrane 120 may be disposed along each of the pressure surface 115 and the suction surface 116. In the illustrated embodiment of FIGS. 3 and 4, the flexible membrane 120 includes a first flexible membrane 120a and a second flexible membrane 120b. The first flexible membrane 120a extends along the pressure surface 115, and the second flexible membrane 120b extends along the suction surface 116. It may be noted that the description of flexible membrane 120 is applicable to both the first flexible membrane 120a and the second flexible membrane 120b.

The flexible membrane 120 may be attached to the pressure surface 115 and/or the suction surface 116 of the aerofoil body 110. Specifically, the flexible membrane 120 may be attached to the suction surface 116 and/or the pressure surface 115 of the aerofoil body 110 by at least one of an adhesive 130 and a fastener 140.

In the illustrated embodiment of FIG. 4, the adhesive 130 includes a first adhesive 130a and a second adhesive 130b. The first flexible membrane 120a is attached to the pressure surface 115 by the first adhesive 130a and the fastener 140. Further, the second flexible membrane 120b is attached to the suction surface 116 by the second adhesive 130b.

The adhesive 130 may include any suitable adhesive, such as an epoxy-based adhesive, a urethane-based adhesive, a silicone-based adhesive, and the like. Further, the fastener 140 may include a bolt, a screw, rivet, and the like.

The flexible membrane 120 may have a maximum length 120L that is defined along the chordal direction $D_C$. The flexible membrane 120 may further have a maximum height 120H that is defined along the spanwise direction $D_S$.

In some embodiments, the maximum length 120L of the flexible membrane 120 may be greater than or equal to 30% of the chord length CL. In some embodiments, the maximum length 120L may be greater than 50%, greater than 55%, greater than 60%, greater than 65%, greater than 70%, greater than 75%, or greater than 80% of the chord length $C_L$. In some embodiments, the maximum length 120L may be equal to the chord length $C_L$.

In some embodiments, the maximum height 120H of the flexible membrane 120 may be greater than or equal to 30% of the span S. In some embodiments, the maximum height 120H may be greater than 50%, greater than 55%, greater than 60%, greater than 65%, greater than 70%, greater than 75%, or greater than 80% of the span S. In some embodiments, the maximum height 120H may be equal to the span S. Specifically, as shown in FIG. 3, in some embodiments, the maximum height 120H may be equal to the span S, such that at least a portion of the flexible membrane 120 extends from the root 111 to the tip 112 of the aerofoil body 110.

In some embodiments, the flexible membrane 120 may be spaced apart from the leading edge 113 by a first distance L1 that is defined along the chordal direction $D_C$. The first distance L1 may refer to a minimum distance between the leading edge 113 and the flexible membrane 120. In some embodiments, the first distance L1 may be from 5% to 20% of the chord length $C_L$. The flexible membrane 120 being spaced apart from the leading edge 113 by the first distance L1 may reduce or minimise an effect of the flexible membrane 120 on an aerodynamic performance of the aerofoil body 110.

It will be appreciated that dimensions of the flexible membrane 120 may be selected based on application requirements.

The flexible membrane 120 may be made from suitable flexible material. As used herein, the term "flexible material" refers to a thin, easily deformable, sheet-like material that allows the flexible membrane 120 to conform to curved profiles of the pressure surface 115 and/or the suction surface 116 of the aerofoil body 110. The flexible material may include intrinsic damping properties.

The flexible membrane 120 made from the flexible material has a lower modulus of elasticity than that of the aerofoil body 110. Specifically, in some embodiments, the aerofoil body 110 has a first modulus of elasticity and the flexible membrane 120 has a second modulus of elasticity. The first modulus of elasticity of the aerofoil body 110 is greater than the second modulus of elasticity of the flexible membrane 120. More specifically the first modulus of elasticity of the aerofoil body 110 is greater than the second modulus of elasticity of the flexible membrane 120 by a factor of at least 2. In some embodiments, the first modulus of elasticity may be greater than the second modulus of elasticity by a factor of at least 3, at least 4, at least 5, at least 6, at least 7, at least 8, at least 9, or at least 10.

In some embodiments, the flexible membrane 120 may include an elastomeric material. The elastomeric material may include any material having elastomeric properties. For example, the elastomeric material may include elastomeric polymers and mixtures of elastomeric polymers with other materials. In some embodiments, the elastomeric material may include a latex. In some embodiments, the elastomeric material may include a latex rubber. In such embodiments, where the flexible membrane 120 includes the elastomeric material, the flexible membrane 120 may be non-porous.

In some other embodiments, the flexible membrane 120 may include aramid fibres. For example, the flexible membrane 120 may be made from KEVLAR™ fabric. In such embodiments, the flexible membrane 120 may be porous.

In some embodiments, the aerofoil body 110 may include a porous portion (not shown). The porous portion may include one or more apertures or holes extending at least partially between the pressure surface 115 and the suction surface 116. The flexible membrane 120 may be disposed on the pressure surface 115 and/or the suction surface 116, such that the flexible membrane 120 at least partially covers the porous portion.

In some embodiments, the aerofoil body 110 may include a first portion (not shown) extending along the chordal direction $D_C$, and a second portion (not shown) extending along the chordal direction $D_C$ and spaced apart from the first portion by an air gap. This configuration may be referred to as a "tandem configuration". The flexible membrane 120 may be disposed on the pressure surface 115 and/or the suction surface 116, such that the flexible membrane 120 at least partially covers the air gap. Preferably, the flexible membrane 120 may fully cover the air gap.

Figure 5:
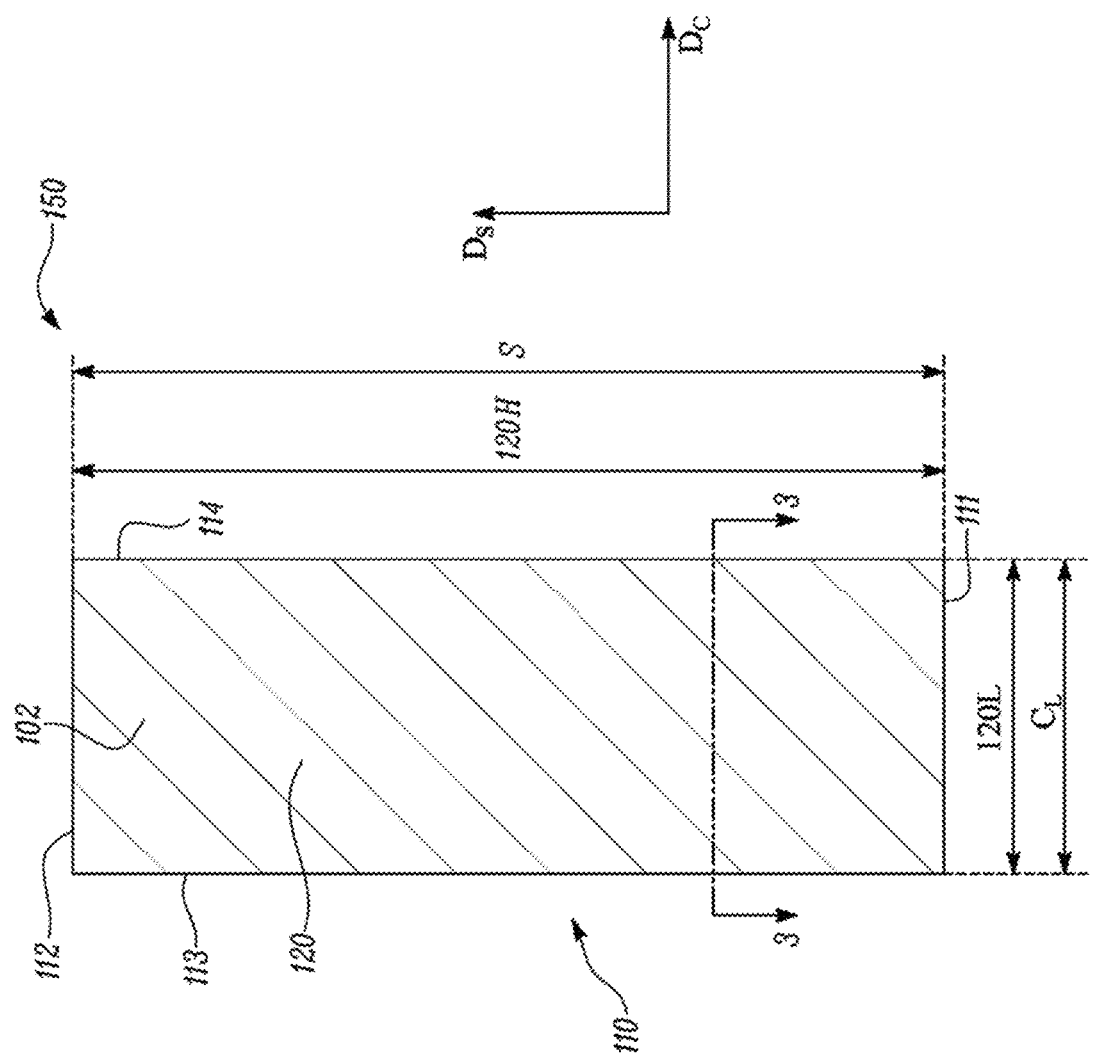
FIG. 5 is a schematic side view of an outlet guide vane.
Figure 6:
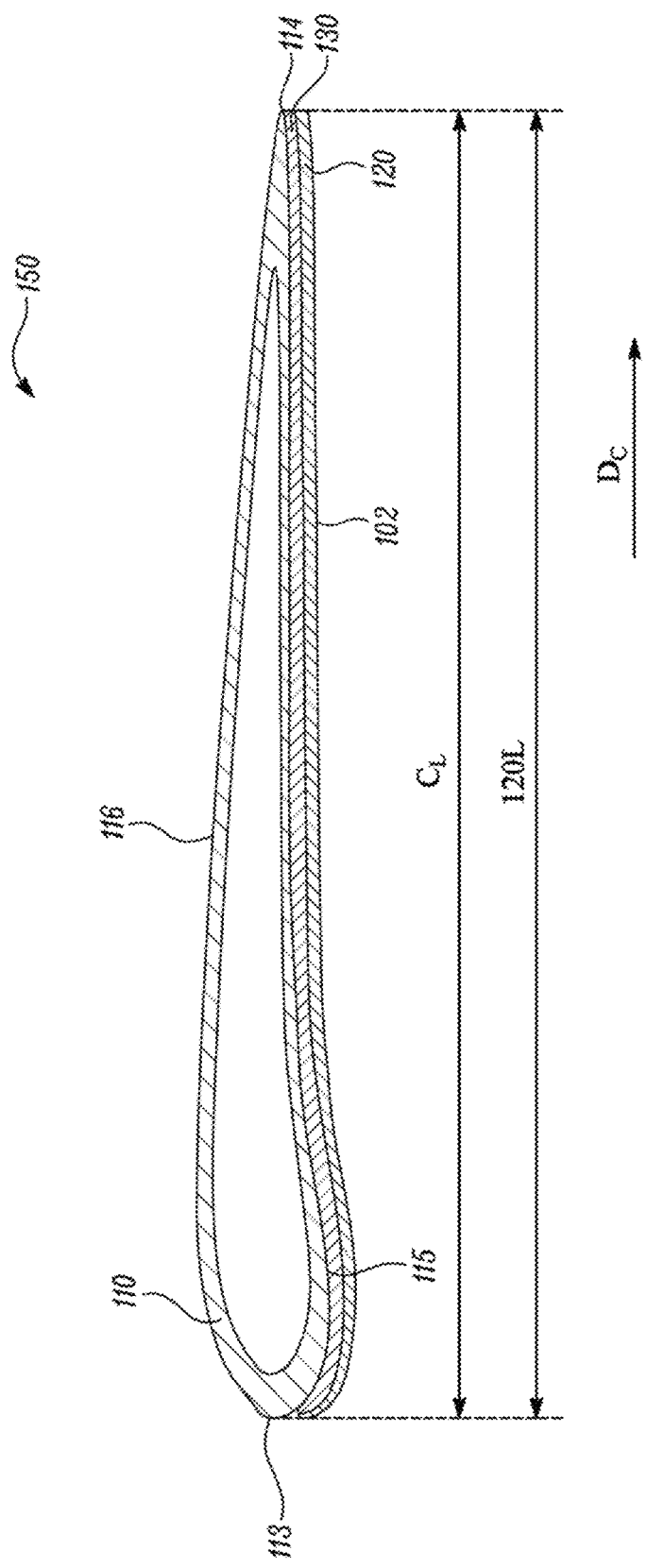
FIG. 6 is a schematic cross-sectional view of the outlet guide vane taken along a line 3-3 of FIG. 5.

FIGS. 5 and 6 show an outlet guide vane 150 in accordance with another embodiment of the present disclosure. Specifically, FIG. 5 shows a schematic side view of the outlet guide vane 150 and FIG. 6 shows a schematic cross-sectional view of the outlet guide vane 150 taken along a line 3-3 of FIG. 5. The outlet guide vane 150 is similar to the outlet guide vane 100 of FIGS. 3 and 4, with like elements designated by like reference characters. However, the outlet guide vane 150 has a different configuration of the flexible membrane 120 than that of the outlet guide vane 100.

Specifically, in the illustrated embodiment of FIGS. 5 and 6, the flexible membrane 120 is disposed on the pressure surface 115 of the aerofoil body 110. Further, the flexible membrane 120 is attached to the pressure surface 115 via the adhesive 130. The maximum length 120L of the flexible membrane 120 is equal to the chord length $C_L$, such that at least a portion of the flexible membrane 120 extends from the leading edge 113 to the trailing edge 114 of the aerofoil body 110. Moreover, the maximum height 120H of the flexible membrane 120 is equal to the span S, such that at least a portion of the flexible membrane 120 extends from the root 111 to the tip 112 of the aerofoil body 110.

Figure 7:
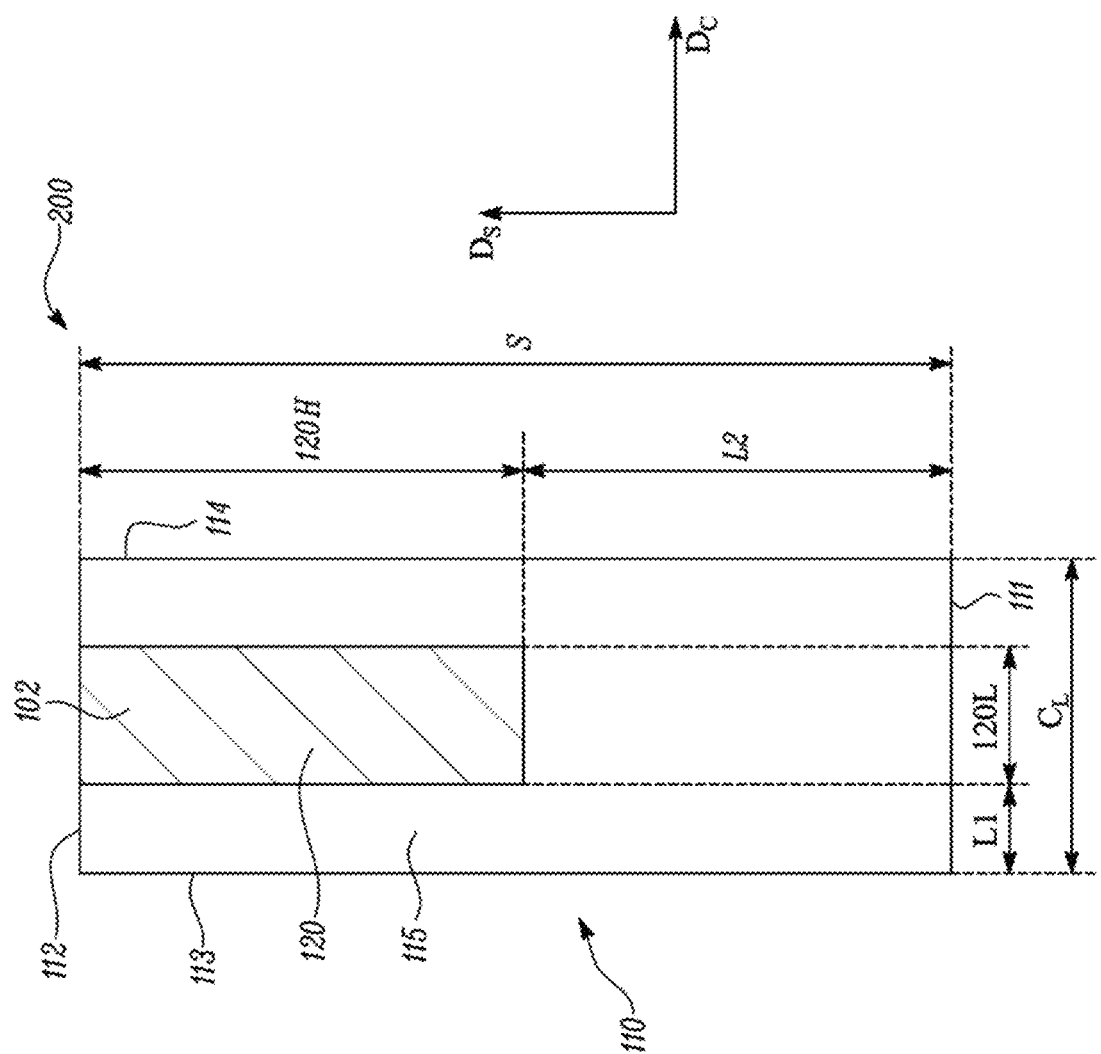
FIG. 7 is a schematic side view of an outlet guide vane.

FIG. 7 shows a schematic side view of an outlet guide vane 200 in accordance with another embodiment of the present disclosure. The outlet guide vane 200 is similar to the outlet guide vane 100 of FIGS. 3 and 4, with like elements designated by like reference characters. However, the outlet guide vane 200 has a different configuration of the flexible membrane 120 than that of the outlet guide vane 100.

Specifically, in the illustrated embodiment of FIG. 7, the flexible membrane 120 is spaced apart from the root 111 by a second distance L2 that is defined along the spanwise direction $D_S$. The second distance L2 may be from 40% to 70% of the span S along the spanwise direction $D_S$.

A majority of the noise generated by the outlet guide vane 200 during operation of the gas turbine engine (e.g., the gas turbine engine 10 of FIG. 1) may be due to the unsteady pressure generated at the leading edge 113 above 60% of the span S from the root 111.

Advantageously, spacing apart the flexible membrane 120 from the root 111 by the second distance L2 may allow use of the flexible membrane 120 having reduced dimensions (e.g., a smaller magnitude of the maximum height 120H) to dampen the unsteady pressure generated at the leading edge 113 above 60% of the span S from the root 111.

Referring now to FIGS. 1 and 3-7, in some embodiments, the gas turbine engine 10 includes the outlet guide vane 100 (see FIGS. 3 and 4). In some embodiments, the gas turbine engine 10 includes the outlet guide vane 150 (see FIGS. 5 and 6). In some embodiments, the gas turbine engine 10 includes the outlet guide vane 200 (see FIG. 7). Specifically, the outlet guide vane assembly 40 of the gas turbine engine 10 may include one or more of the outlet guide vane 100, the outlet guide vane 150, and the outlet guide vane 200.

Figure 8:
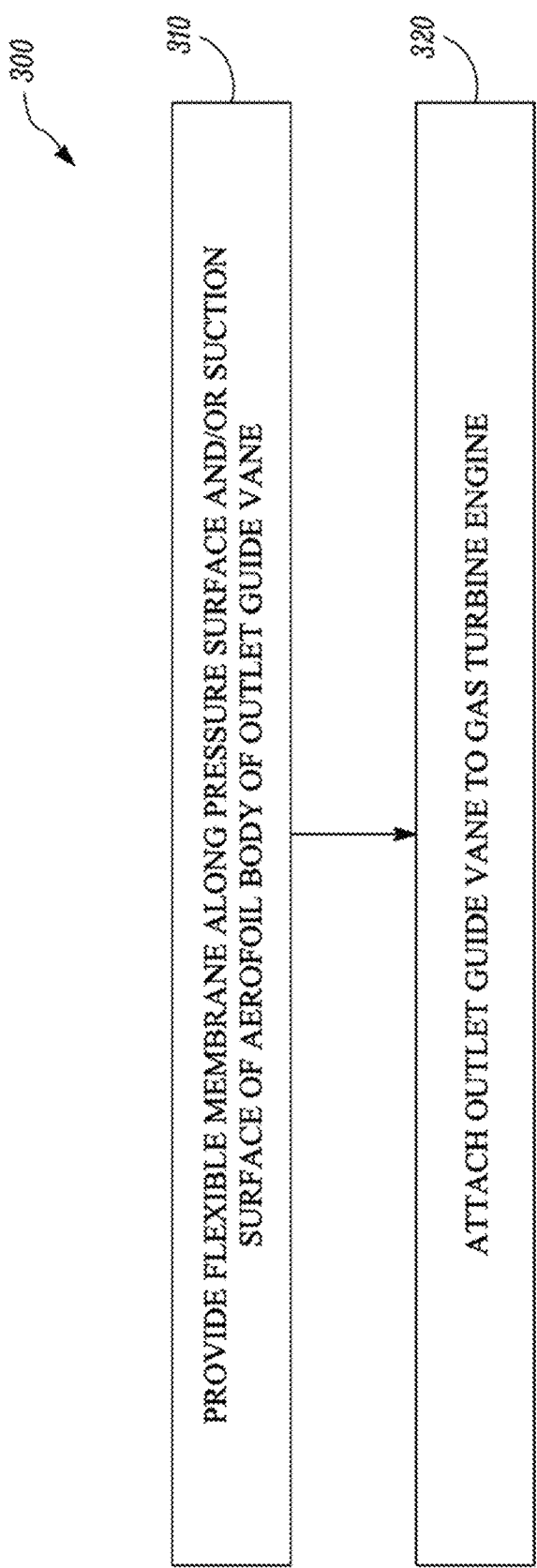
FIG. 8 is a flowchart depicting various steps of a method for reducing noise generated by an outlet guide vane.

FIG. 8 shows a flowchart depicting various steps of a method 300 for reducing noise generated by an outlet guide vane (e.g., the outlet guide vane 42 of FIG. 2) of a gas turbine engine (e.g., the gas turbine engine 10 of FIG. 1) during operation of the gas turbine engine in accordance with an embodiment of the present disclosure. The outlet guide vane includes an aerofoil body. The aerofoil body includes a root, a tip that is remote from the root, a leading edge extending between the root and the tip, a trailing edge extending between the root and the tip opposite to the leading edge, a pressure surface extending between the root and the tip opposite to the leading edge, and a suction surface extending between the leading edge and the trailing edge opposite to the pressure surface.

Figure 2:
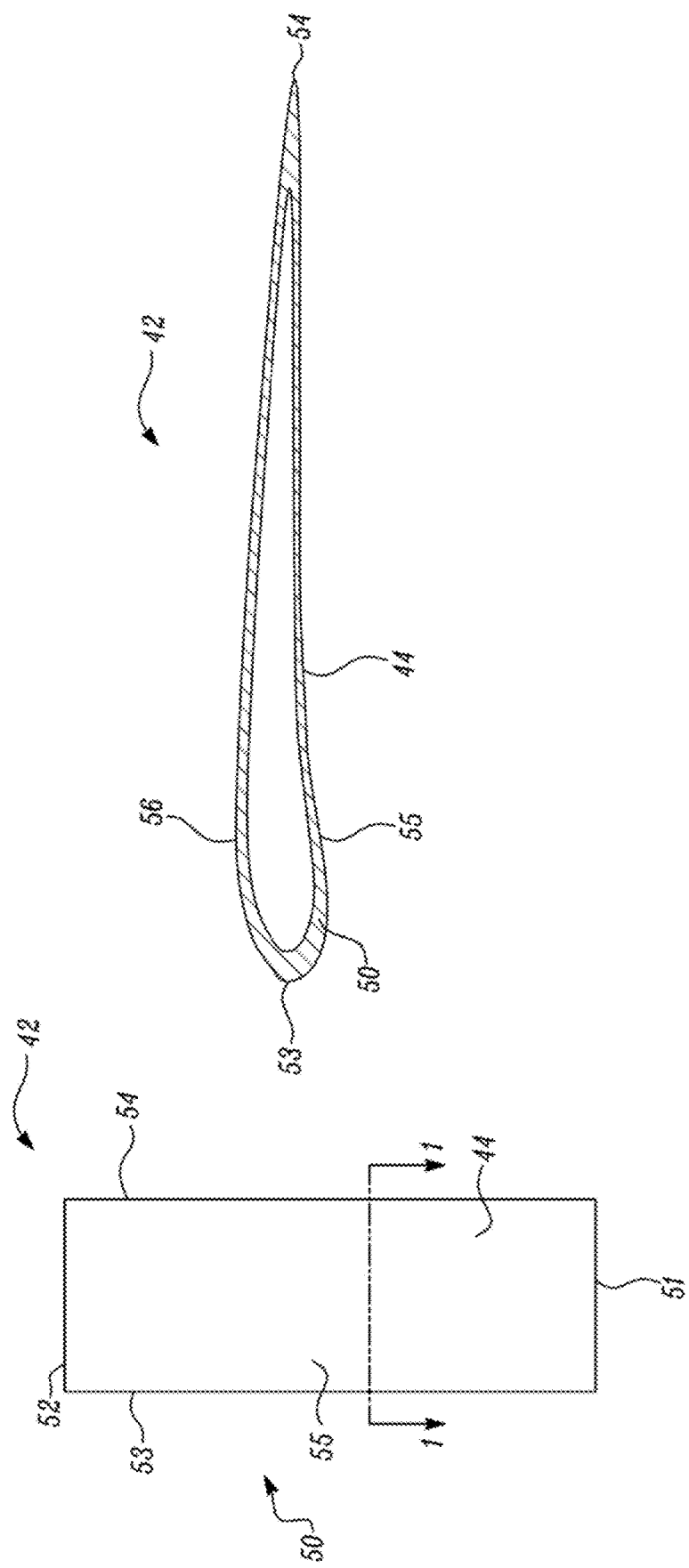
FIG. 2A is a schematic side view of an outlet guide vane.
FIG. 2B is a schematic cross-sectional view of the outlet guide vane taken along a line 1-1 of FIG. 2A.

For example, the method 300 may be suitable for use with the outlet guide vane 42 of FIG. 2 including the aerofoil body 50. The method 300 will be described with additional reference to FIGS. 2-7.

At step 310, the method 300 includes providing a flexible membrane along the pressure surface and/or the suction surface of the aerofoil body of the outlet guide vane, such that the flexible membrane at least partially forms an outer surface of the outlet guide vane. For example, the method 300 may include providing the flexible membrane 120 (see FIG. 3) along the pressure surface 55 and/or the suction surface 56 of the aerofoil body 50 of the outlet guide vane 42, such that the flexible membrane 120 at least partially forms an outer surface 44 of the outlet guide vane 42.

In some embodiments, providing the flexible membrane along the pressure surface and/or the suction surface of the aerofoil body of the outlet guide vane may include attaching the flexible membrane to the pressure surface and/or the suction surface. For example, providing the flexible membrane 120 along the pressure surface 55 and/or the suction surface 56 of the aerofoil body 50 of the outlet guide vane 42 may include attaching the flexible membrane 120 to the pressure surface 55 and/or the suction surface 56. The flexible membrane 120 may be attached to the pressure surface 55 and/or the suction surface 56 of the aerofoil body 50 via an adhesive (e.g., the adhesive 130 shown in FIG. 4) or a fastener (e.g., the fastener 140 shown in FIG. 4).

The method 300 may further include step 320. At step 320, the method 300 may further include attaching the outlet guide vane to the gas turbine engine. For example, the method 300 may further include attaching the outlet guide vane 42 provided with the flexible membrane 120 to the gas turbine engine 10 (shown in FIG. 1). More specifically, the method 300 may include attaching the outlet guide vane 42 provided with the flexible membrane 120 to the outlet guide vane assembly 40 of FIG. 1.

The method 300 may be performed to reduce noise generated by the outlet guide vane (e.g., the outlet guide vane 42 of FIG. 2) during operation of the gas turbine engine. Specifically, the flexible membrane 120 may dampen an unsteady pressure generated at the leading edge 53 of the aerofoil body 50, thereby reducing the noise generated during operation of the gas turbine engine. Moreover, the flexible membrane 120 may not have a significant adverse effect on an aerodynamic performance of the aerofoil body 50.

Figure 9:
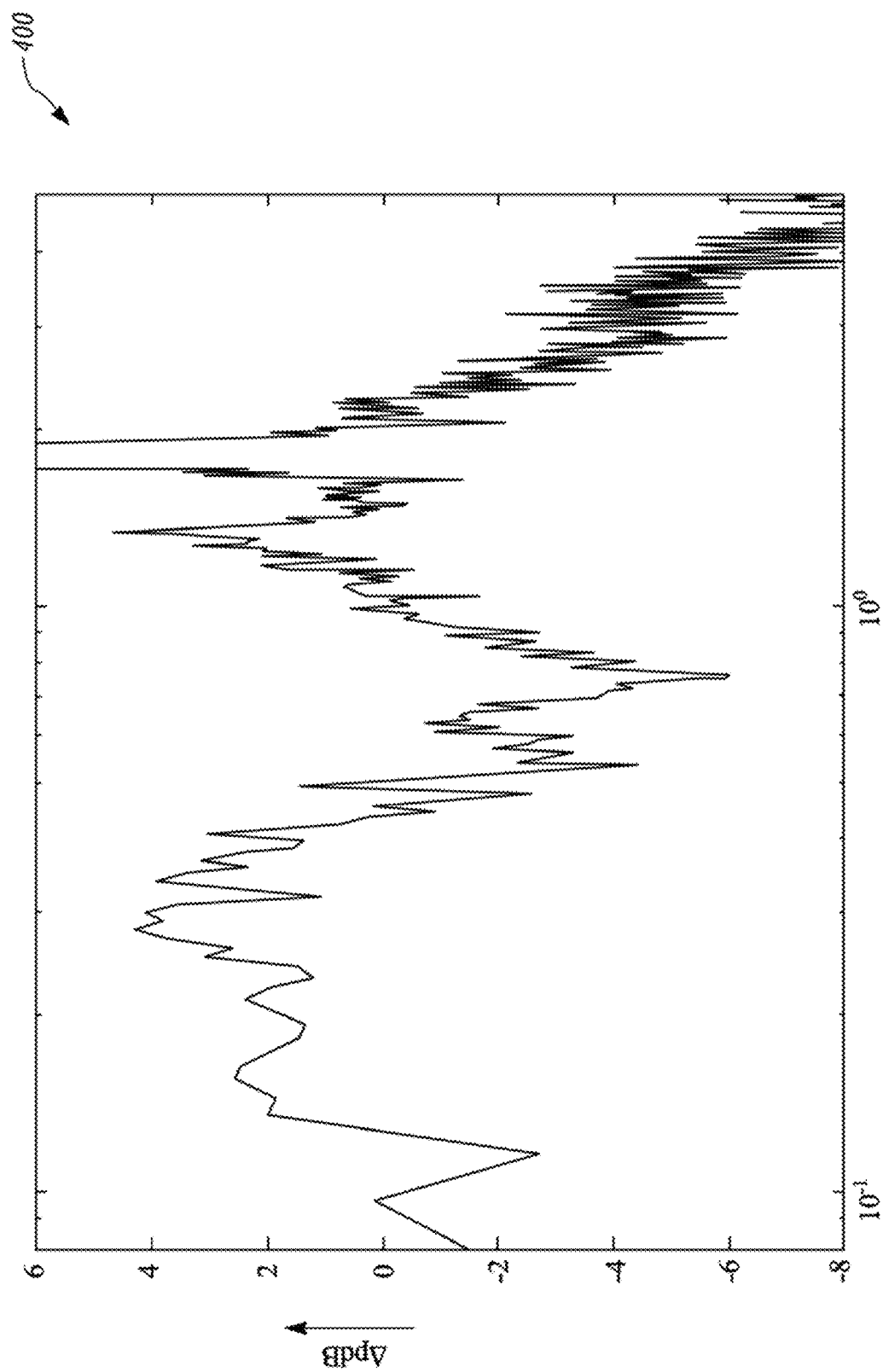
FIG. 9 is a graph depicting results of wind tunnel testing of the outlet guide vane of FIG. 3.

FIG. 9 shows a graph 400 depicting results of wind tunnel testing of the outlet guide vane 100 of FIG. 3.

The outlet guide vane 100 that included the flexible membrane 120 was compared to a conventional outlet guide vane, or more specifically, the outlet guide vane 42 of FIG. 2 that did not include the flexible membrane 120. The flexible membrane 120 was made from latex rubber. Noise was measured by microphones in a wind tunnel and corrected to obtain a perceived noise level (pdB).

Results from the outlet guide vane 100 of FIG. 1 and the outlet guide vane 42 of FIG. 2 were compared to provide a relative perceived noise level ΔpdB, with a positive value representing a reduction in noise, and a negative value representing an increase in noise relative to the outlet guide vane 42 that did not include the flexible membrane 120.

In FIG. 9, the relative perceived noise level ΔpdB is plotted on the ordinate axis (y-axis) against non-dimensional frequency $FC_L/U$ on the abscissa (x-axis). Tests were conducted at an incoming airstream velocity U of 40 metres per second (m/s). As shown by the graph 400, a relatively consistent noise reduction was observed across a broad range of frequencies corresponding to the range of human hearing. An increase in noise at high frequencies was also observed, but these high frequencies were at or beyond the limit of human hearing.

Figure 10:
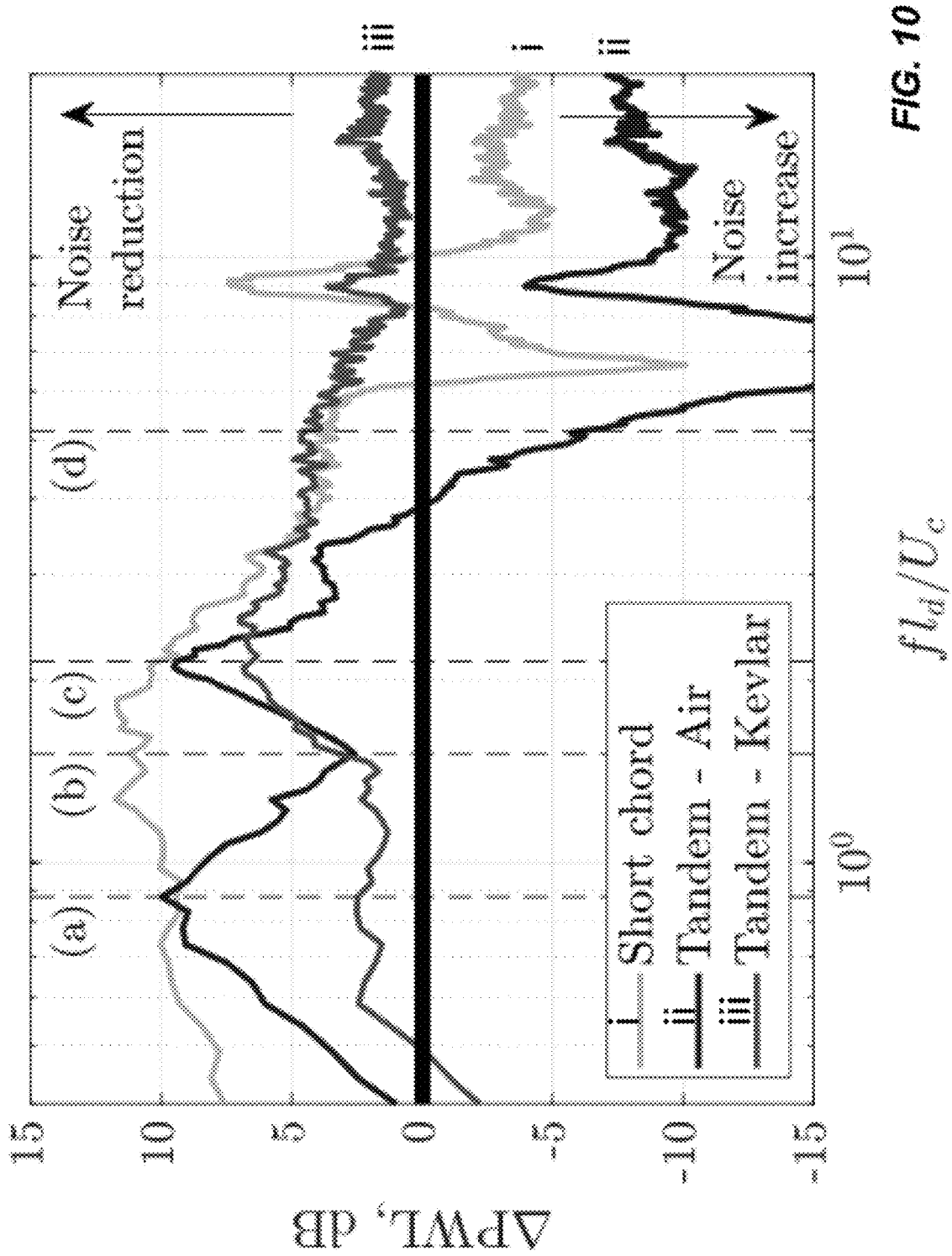
FIG. 10 is a graph that shows sound power noise reduction spectra for various flat plate aerofoil configurations

FIG. 10 is a graph that shows sound power noise reduction spectra for various flat plate aerofoil configurations.

As mentioned above in some other embodiments, the flexible membrane 120 may be made from KEVLAR™ fabric. In such embodiments, the flexible membrane 120 may be porous. Recent unpublished research has shown that turbulence-aerofoil interaction noise can be reduced by the use of KEVLAR™ fabric covered air gaps. This follows research disclosed by S. Palleja-Cabre et al in "Downstream porosity for the reduction of turbulence-aerofoil interaction noise", *Journal of Sound and Vibration* 541 (2002) 117324, incorporated herein by reference, regarding the reduction of turbulence interaction noise by using porosity located downstream of an aerofoil. A principal finding of that article was that the noise reduction spectra at low frequencies for a flat plate with downstream porosity are almost identical in shape to that of two flat plates in a tandem configuration, in which the porous section is effectively replaced by an air gap (100% porosity). Noise was observed at higher frequencies and that was especially severe in the tandem configuration, which showed strong interaction noise radiated due to the impingement of the wake shed from the upstream plate onto the leading edge of the downstream plate.

In the recent research the gap between the two flat plates in a tandem configuration is bridged with a KEVLAR™ fabric The experiments were carried out in the same open-jet wind tunnel facility as before. The experimental set-up consisted of two rigid flat plates arranged in tandem configuration and separated by an air gap or slot. This slot was covered with KEVLAR™ fabric (Fabric ID K0120, Kevlar 49, plain weave, 61 g/m$^2$, yarn tex 22/22 warp/weft, Setting 13.5 th/13.5 cm warp/weft, thickness 0.12 mm) taped at the trailing edge of the first plate and at the leading edge of the second plate. By bridging the air gap between the two plates with a KEVLAR™ fabric (iii) any additional noise source was completely suppressed. The tandem configuration with the KEVLAR™ fabric was found to yield noise reductions over practically all frequencies with up to 7 dB of noise reduction at around 1 kHz. Similar results are also obtained at other inflow velocities U. Noise reduction spectra are shown in FIG. 10. The graph also shows noise reduction spectra obtained by just considering the upstream plate of a short chord (i). The tandem configuration with an air gap (ii) presents well-defined peaks of noise reduction at the low frequencies before the vortex shedding noise becomes dominant.

The main features of the noise reduction spectra shown in FIG. 10 did not remain the same when a KEVLAR™ fabric was introduced to bridge the gap between the two plates. It is shown that this configuration (iii) did not present distinct peaks of noise reduction as in the case of the air gap. Instead, weaker broadband noise reductions were achieved practically over the whole spectra. Similar levels of noise reduction were observed however between the "Short chord" (i) and the "Tandem-Kevlar" (iii) configurations in the mid-frequency range ($4<fl_d/U_c<7$).

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An outlet guide vane for a gas turbine engine, the outlet guide vane comprising:
    an aerofoil body including a root, a tip that is remote from the root, a leading edge extending between the root and the tip, a trailing edge extending between the root and the tip opposite to the leading edge, a pressure surface extending between the leading edge and the trailing edge, and a suction surface extending between the leading edge and the trailing edge opposite to the pressure surface; and
    a flexible membrane disposed along the pressure surface and/or the suction surface of the aerofoil body, such that the flexible membrane at least partially forms an outer surface of the outlet guide vane;
    wherein the aerofoil body has a first modulus of elasticity and the flexible membrane has a second modulus of elasticity, and wherein the first modulus of elasticity of the aerofoil body is greater than the second modulus of elasticity of the flexible membrane by a factor of at least 2, wherein the aerofoil body has a span that is defined between the root and the tip along a spanwise direction, wherein the flexible membrane is spaced apart from the root by a distance that is defined along the spanwise direction, and the distance is from 40% to 70% of the span, and wherein the flexible membrane extends to the tip of the aerofoil body, wherein the flexible membrane is attached to the pressure surface and the suction surface of the aerofoil body.

2. The outlet guide vane of claim 1, wherein the aerofoil body has a chord length that is defined between the leading edge and the trailing edge along a chordal direction (DC), wherein the flexible membrane has a maximum length that is defined along the chordal direction, and wherein the maximum length of the flexible membrane is greater than or equal to 30% of the chord length.

3. The outlet guide vane of claim 2, wherein the maximum length of the flexible membrane is equal to the chord length, such that at least a portion of the flexible membrane extends from the leading edge to the trailing edge of the aerofoil body.

4. The outlet guide vane of claim 2, wherein the flexible membrane is spaced apart from the leading edge by a first distance that is defined along the chordal direction, and wherein the first distance is from 5% to 20% of the chord length.

5. The outlet guide vane of claim 1, wherein the flexible membrane is attached to the pressure surface and the suction surface of the aerofoil body by at least one of an adhesive and a fastener.

6. The outlet guide vane of claim 1, wherein the flexible membrane comprises an elastomeric material.

7. The outlet guide vane of claim 6, wherein the elastomeric material comprises a latex.

8. The outlet guide vane of claim 1, wherein the flexible membrane comprises aramid fibres.

9. The outlet guide vane of claim 1, wherein the aerofoil body is formed to include at least one aperture extending between the pressure surface and the suction surface, and wherein the flexible membrane extends along the pressure surface and the suction surface of the aerofoil body over the at least one aperture.

10. The outlet guide vane of claim 1, wherein the distance is 60% of the span.

11. A method of reducing noise generated by an outlet guide vane of a gas turbine engine during operation of the gas turbine engine, the outlet guide vane comprising an aerofoil body including a root, a tip that is remote from the root, a leading edge extending between the root and the tip, a trailing edge extending between the root and the tip opposite to the leading edge, a pressure surface extending between the leading edge and the trailing edge, and a suction surface extending between the leading edge and the trailing edge opposite to the pressure surface, the method comprising providing a flexible membrane along the pressure surface and the suction surface of the aerofoil body of the outlet guide vane, such that the flexible membrane at least partially forms an outer surface of the outlet guide vane, wherein the aerofoil body has a first modulus of elasticity and the flexible membrane has a second modulus of elasticity, and wherein the first modulus of elasticity of the aerofoil body is greater than the second modulus of elasticity of the flexible membrane by a factor of at least 2, wherein the aerofoil body has a chord length that is defined between the leading edge and the trailing edge along a chordal direction and a span that is defined between the root and the tip along a spanwise direction, and wherein the flexible membrane extends along the entire chord length between the leading edge and the trailing edge and extends along the entire span between the tip and the root.

12. The method of claim 11, wherein providing the flexible membrane along the pressure surface and the suction surface of the aerofoil body of the outlet guide vane comprises attaching the flexible membrane to the pressure surface and the suction surface.

13. The method of claim 11, further comprising dampening an unsteady pressure generated at the leading edge of the aerofoil body via the flexible membrane thereby reducing the noise generated during operation of the gas turbine engine.

14. The method of claim 11, wherein the flexible membrane comprises an elastomeric material.

15. An outlet guide vane for a gas turbine engine, the outlet guide vane comprising:

an aerofoil body including a root, a tip spaced apart from the root, a leading edge extending between the root and the tip, a trailing edge extending between the root and the tip opposite to the leading edge, a pressure surface extending between the leading edge and the trailing edge, and a suction surface extending between the leading edge and the trailing edge opposite to the pressure surface, and wherein the aerofoil body is formed to include at least one aperture extending between the pressure surface and the suction surface; and a flexible membrane extending along the pressure surface and the suction surface of the aerofoil body over the at least one aperture such that the flexible membrane at least partially forms an outer surface of the outlet guide vane;

wherein the aerofoil body has a first modulus of elasticity and the flexible membrane has a second modulus of elasticity, and wherein the first modulus of elasticity of the aerofoil body is greater than the second modulus of elasticity of the flexible membrane by a factor of at least 2.

16. The outlet guide vane of claim 15, wherein the flexible membrane extends entirely between the leading edge and the trailing edge of the aerofoil body on both the pressure side and the suction side of the aerofoil body.

17. The outlet guide vane of claim 16, wherein the flexible membrane extends entirely between the root and the tip of the aerofoil body on both the pressure side and the suction side of the aerofoil body.

18. The outlet guide vane of claim 15, wherein the flexible membrane is adhered to an outer surface of the pressure surface and the suction surface.

19. The outlet guide vane of claim 15, wherein the aerofoil body has a span that is defined between the root and the tip along a spanwise direction, wherein the flexible membrane is spaced apart from the root by a distance that is defined along the spanwise direction, and the distance is about 60% of the span, and wherein the flexible membrane extends to the tip of the aerofoil body.

20. The outlet guide vane of claim 15, wherein the flexible membrane comprises aramid fibres.

* * * * *